(12) United States Patent
Whiting et al.

(10) Patent No.: US 12,406,162 B2
(45) Date of Patent: *Sep. 2, 2025

(54) ACCESSIBLE CARD WITH CURVED TACTILE FEATURE

(71) Applicant: Truist Bank, Charlotte, NC (US)

(72) Inventors: Greg Whiting, Roswell, GA (US); Hyekyeng Lyn Kim, Matthews, NC (US)

(73) Assignee: Truist Bank, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/796,523

(22) Filed: Aug. 7, 2024

(65) Prior Publication Data

US 2024/0394498 A1 Nov. 28, 2024

Related U.S. Application Data

(63) Continuation of application No. 18/455,223, filed on Aug. 24, 2023, now Pat. No. 12,093,761, which is a continuation of application No. 17/695,966, filed on Mar. 16, 2022, now Pat. No. 11,775,793, which is a continuation of application No. 17/695,923, filed on Mar. 16, 2022.

(51) Int. Cl.
*G06K 19/04* (2006.01)
*G06F 21/34* (2013.01)
*G06K 19/077* (2006.01)
*G09B 21/00* (2006.01)

(52) U.S. Cl.
CPC ........... *G06K 19/041* (2013.01); *G06F 21/34* (2013.01); *G06K 19/0772* (2013.01); *G09B 21/003* (2013.01)

(58) Field of Classification Search
CPC ........... G06K 19/041; G06K 19/07772; G06K 19/00; G09B 21/003; G06Q 20/34; G06Q 20/341; G06F 21/34
USPC .................. 235/380, 375, 492, 494; 382/115
See application file for complete search history.

(56) References Cited

U.S. PATENT DOCUMENTS

| | | | |
|---|---|---|---|
| 11,769,030 B2 * | 9/2023 | Roessner | G06Q 20/40145 235/492 |
| 2006/0118618 A1 * | 6/2006 | Schultz | G06K 19/06018 235/380 |
| 2014/0263664 A1 * | 9/2014 | Branca, Jr. | B43K 23/001 235/492 |

* cited by examiner

Primary Examiner — Edwyn Labaze
(74) Attorney, Agent, or Firm — Kilpatrick Townsend & Stockton LLP; Michael A. Springs, Esq.

(57) ABSTRACT

An accessible card can provide access to an account. The account card can include sides and a curved tactile feature. The sides can be connected to form a shape that includes a central point. The curved tactile feature can provide access to an account and can be associated with a side. The side can include a first size that is different than a second size associated with other sides, a first distance to the central point of the shape that is different than a second distance to the central point of the shape associated with the other sides, and a first arc length that is different than a second arc length associated with the other sides.

20 Claims, 3 Drawing Sheets

ACCESSIBLE CARD WITH CURVED TACTILE FEATURE

CROSS-REFERENCE TO RELATED APPLICATIONS

This is a continuation of U.S. Non-Provisional application Ser. No. 18/455,223, filed Aug. 24, 2023 and titled "Accessible Card with Curved Tactile Feature," of U.S. Non-Provisional application Ser. No. 17/695,966 (now U.S. Pat. No. 11,775,793), filed Mar. 16, 2022 and titled "Accessible Card with Curved Tactile Feature," and of U.S. Non-Provisional application Ser. No. 17/695,923, filed Mar. 16, 2022 and titled "Accessible Card with Curved Tactile Feature," the contents of each of which are incorporated herein by reference for all purposes.

TECHNICAL FIELD

The present disclosure relates to cards and, more particularly (although not necessarily exclusively), to an accessible card that includes a curved tactile feature.

BACKGROUND

An account can include a set of data held by a first entity (e.g., a user) and associated with a second entity (e.g., a provider). The second entity may issue an account card that can provide access for the first entity to the account. For example, the first entity can use the account card or information included with the account card to access the account via a computing device such as by logging onto an online version of the account, by logging into the account via a computing device (e.g., an automatic teller machine) provided by the second entity, and the like. But, the account may not be accessible to the first entity via the account card. For example, the first entity may experience a disability or may experience other similar challenges. The first entity may not be able to visually perceive the account card. For example, the first entity may not be able to identify the account card or read the information included with the account card due to colorblindness, vision impairment, etc.

SUMMARY

In one example, an accessible card can provide access to an account. The account card can include sides and a curved tactile feature. The sides can be connected to form a shape that includes a central point. The curved tactile feature can provide access to an account and can be associated with a side. The side can include a first size that is different than a second size associated with other sides, a first distance to the central point of the shape that is different than a second distance to the central point of the shape associated with the other sides, and a first arc length that is different than a second arc length associated with the other sides.

In another example, a card system can include a first account card and a second account card. The first account card can include a first set of sides and a first curved tactile feature. The first set of sides can be connected to form a first shape. The first curved tactile feature can provide access to a first account. The first curved tactile feature can be associated with at least one side of the first set of sides. The at least one side of the first set of sides can include a first arc length that is different than a second arc length associated with the other sides of the first set of sides. The second account card can include a second set of sides and a second curved tactile feature. The second set of sides can be connected to form a second shape that is different than the first shape. The second curved tactile feature can provide access to a second account. The second curved tactile feature can be different than the first curved tactile feature and can be associated with at least one side of the second set of sides. The at least one side of the second set of sides can include a third arc length that is different than a fourth arc length associated with the other sides of the second set of sides.

In a further example, a method can include using an account card. The account card can be received. The account card can include sides and a curved tactile feature. The sides can be connected to form a shape that includes a central point. The curved tactile feature can provide access to an account and can be associated with a side of the account card. The side can include a first size that is different than a second size associated with other sides, a first distance to the central point of the shape that is different than a second distance to the central point of the shape associated with the other sides, and a first arc length that is different than a second arc length associated with the other sides. An account associated with the account card can be determined via the curved tactile feature. An orientation of the account card can be determined via the curved tactile feature. The account associated with the account card can be accessed based on the orientation and using the account card.

DETAILED DESCRIPTION

Certain aspects and features of the present disclosure relate to an accessible account card that includes a curved tactile feature for providing access to an account regardless of disability. The accessible account card can be provided to a first entity (e.g., a user of services) by a second entity (e.g., a provider of services) and can be associated with the account. The account can include confidential or otherwise sensitive information. For example, the account can include a medical account, a financial account, an information technology account, or other suitable types of accounts. The first entity can include a user or other suitable type of account holder that holds the account with the second entity, which can include various suitable types of account providers such as a medical provider, a financial services provider, an information technology services provider, and the like. The accessible account card can be used (e.g., by the first entity) to access the account. The curved tactile feature can include a curved corner, a notch, raised surfaces, varying materials, or other suitable features that can allow the first entity to use the accessible account card regardless of any disability or challenge experienced by the first entity. In an example in which the first entity cannot visually perceive the account card, the curved tactile feature can allow the first entity to physically perceive or experience the accessible account card for determining the account associated with the accessible account card, the orientation of the accessible account card, and the like.

Other account cards may not provide access to an account to one or more entities. For example, the other account cards may be physically similar or identical to one another and, thus, may not be distinguishable via physical perception or tactile interaction. For example, the other account cards may include similar or identical dimensions, similar or identical shapes or sizes, similar or identical features, etc. Additionally, the other account cards may include hard-to-read information associated with the account. For example, the other account cards may include small-print information, low-contrast information, excessive amounts of information, other types of hard-to-read information, or any suitable combination thereof. In some examples, an entity that experiences visual challenges (e.g., blindness, colorblindness, location-based visual impairment, etc.) may not be able to determine the hard-to-read information. Accordingly, the entity may not be able to access the account using the other account cards.

An accessible account card can provide increased access to an account compared to the other account cards. For example, the accessible account card can provide access to the account for an entity having one or more disabilities or that are experiencing other similar challenges. The entity may experience visual impairment such as blindness, colorblindness, location-based visual impairment (e.g., far-sightedness or near-sightedness), or other similar form of visual impairment. Additionally or alternatively, the entity may experience other physical disabilities, digital disabilities (e.g., difficulty accessing the account via a computing device, etc.), or the like. The accessible account card can be used by the entity regardless of disability or other challenge, which would prevent the entity from accessing the account using the other account cards, experienced by the entity.

The accessible account card can include a curved tactile feature that can provide accessibility to an entity to which the accessible account card is issued. For example, the curved tactile feature can allow the entity to identify, via tactile interaction, the accessible account card and to determine, via tactile interaction, an orientation of the accessible account card. The curved tactile feature can be positioned on a corner of the accessible account card and may include a radius-of-curvature that is different than the other corners of the accessible account card. For example, the other corners of the accessible account may include a radius-of-curvature of a few millimeters or less or may not be curved (e.g., the other corners may include an angle of approximately 90°). The curved tactile feature, however, may include a radius-of-curvature that is substantially larger than that of the other corners. For example, the radius-of-curvature of the curved tactile feature may be one centimeter, two centimeters, or any other suitable measure for allowing the curved tactile feature to provide accessibility to the entity.

Additionally or alternatively to an increased radius-of-curvature compared to the other corners of the accessible account card, the curved tactile feature can include other suitable tactile features. For example, the other suitable tactile features can include one or more notches, one or more raised surfaces, one or more different materials, or other suitable features. A notch can include a piece of removed material from the accessible account card. A raised surface can include one or more surfaces of the accessible account card that include varying height or thickness. The different materials can include different roughness or other suitable features of the accessible account card detectable via physical touch or tactile interaction. The other suitable tactile features (e.g., notch, raised surface, varying materials, etc.) can be positioned in a corner of the accessible account card or in other suitable locations (e.g., along an edge, in the middle, etc.) with respect to the accessible account card.

Additionally, the accessible account card can include account information that is easy-to-read. For example, the account information can be optimized (e.g., minimized) to avoid including excessive amounts of account information on the accessible account card. The account information can include an entity name, an account number, a security code, a contact number, other suitable account information, or any suitable combination thereof. In some examples, the account information may be easy-to-read based on various parameters such as font type, font size, contrast, and other suitable parameters.

The font type can be determined based on readability, which may include a measure of visual perception, of the font type. For example, the accessible account card may include a font type (e.g., Calibri, Times New Roman, Arial, etc.) that is optimal for readability (e.g., easiest to read or otherwise visually perceive). In some examples, the font type can include bolded features, underlined features, or other features for increasing the readability of the font. The font size can be larger than font size of the other account cards. For example, the font size of the account information can be maximized for placement in respective locations on the accessible account card. The contrast can include a minimum contrast ratio. For example, the minimum contrast ratio can be 3.5, 4.0, 4.65, or any other suitable contrast ratio value for the accessible account card. In some examples, the contrast ratio can be from 4.65 to 21. The contrast ratio of the account information (e.g., with respect to the accessible account card) can allow the entity to more easily (e.g., compared to other account cards) read the account information. Additionally, the font size can be within a predetermined range (e.g., from 14 point font to 72 point font, or any other suitable range).

Manufacturing the accessible account card can be easier than manufacturing other account cards. For example, other account cards may include irregular shapes or may include excessive amounts of material. The irregular shapes may include non-continuous edges, non-uniform thicknesses, or other irregular shapes that are difficult to manufacture. The accessible account card may include continuous edges, uniform thickness, and may reduce an amount of material (e.g., compared to the other account cards) used to manufacture the accessible account card. For example, the curved tactile feature may be continuous and may reduce the amount of material used to manufacture the accessible account card. Additionally, the accessible account card may be uniform in thickness (e.g., to optimize readability), which may reduce a difficulty of manufacturing the accessible account card compared to the other account cards.

In the following description, for the purposes of explanation, specific details are set forth in order to provide a thorough understanding of various implementations and examples. Various implementations may be practiced without these specific details. The figures and description are not intended to be restrictive.

Figure 1:
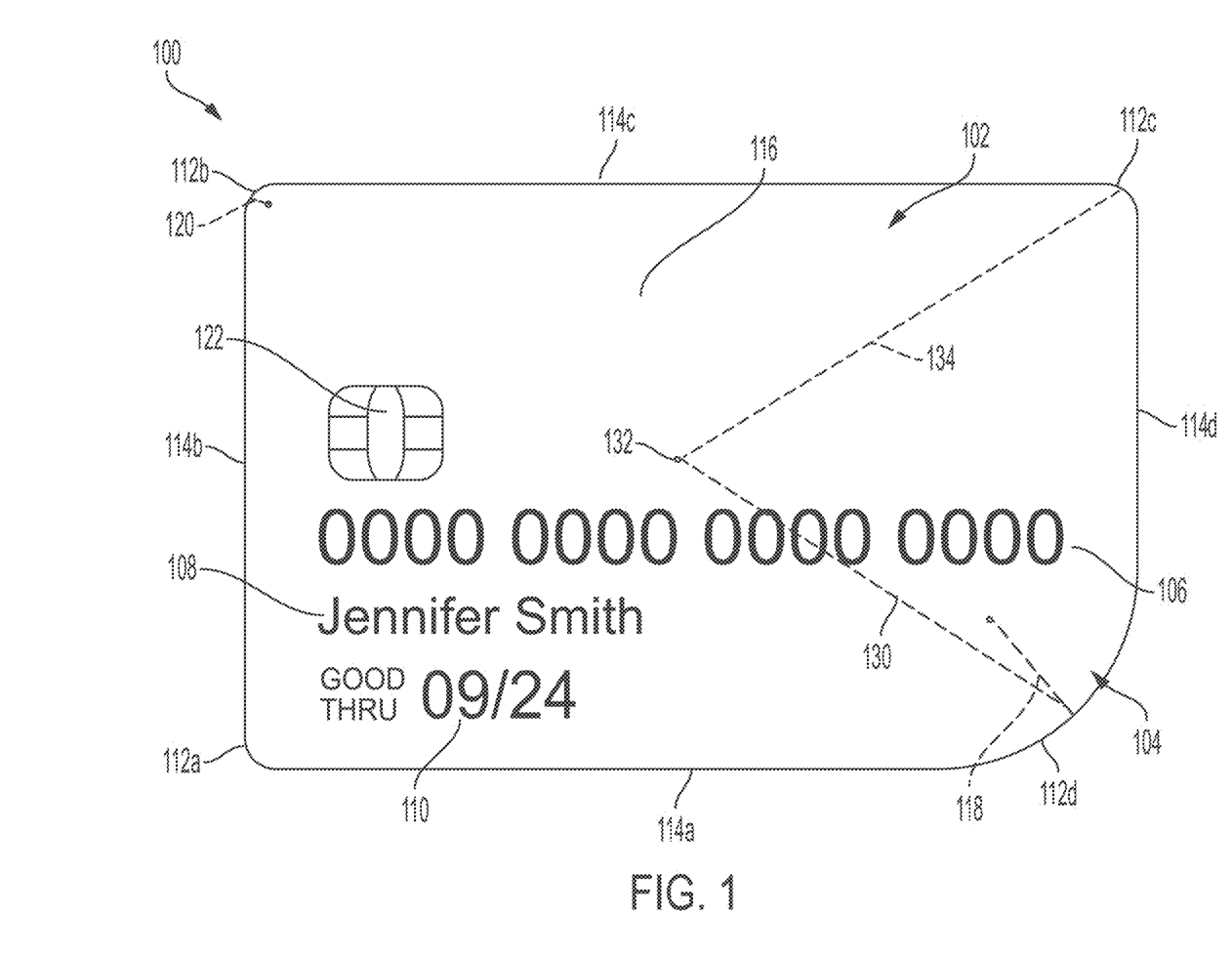
FIG. 1 is a diagram of an example of a front side of an accessible account card having a curved tactile feature according to one example of the present disclosure.

FIG. 1 is a diagram of an example of a front side 102 of an accessible account card 100 having a curved tactile feature 104 according to one example of the present disclosure. The front side 102 of the accessible account card 100 can additionally include a first set of account information. For example, the first set of account information can include an account number 106, an entity name 108, and an account expiration date 110. The front side 102 of the accessible account card 100 can include any other suitable information or features for providing accessibility to the entity.

As illustrated, the accessible account card 100 is approximately rectangular-like shaped and includes four corners 112a-d, four edges 114a-d, and a background 116. The four corners 112a-d and the four edges 114a-d may be respectively connected to form an outline (e.g., a shape) of the accessible account card 100, and the background 116 may be, may be included in, or may include an interior region of the accessible account card 100. For example, the corner 112a can be connected to the corner 112b via the edge 114b, which can extend from the corner 112a to the corner 112b. The corner 112b can be connected to the corner 112c via the edge 114c, which can extend from the corner 112b to the corner 112c. The corner 112c can be connected to the corner 112d via the edge 114d, which can extend from the corner 112c to the corner 112d. The corner 112d can be connected to the corner 112a via the edge 114a, which can extend from the corner 112d to the corner 112a. The corners 112a-d and the edges 114a-d can be otherwise suitably arranged for allowing the accessible account card 100 to provide account access to the entity. In some examples, the accessible account card 100 can represent other suitable shapes (e.g., square, elliptical, etc.) other than the illustrated rectangle-like shape.

As illustrated, the curved tactile feature 104 is positioned in a lower-rear portion (e.g., the corner 112d) of the front side 102 of the accessible account card 100. The curved tactile feature 104 can be positioned in any other suitable location (e.g., along one or more edges 114, in one or more other suitable corners 112, etc.) with respect to the accessible account card 100. The curved tactile feature 104 can include a radius-of-curvature 118 that can represent an amount of curvature of the curved tactile feature 104. For example, the radius-of-curvature 118 can be increased to increase a size (e.g., a surface area, an arc length, etc.) of the curved tactile feature 104 or decreased to decrease the size of the curved tactile feature 104. Additionally, the curved tactile feature 104 can include a maximum distance 130 to a central point 132 of the accessible account card 100. The maximum distance 130 may be different (e.g., smaller than) a maximum distance 134 of other corners 112a-c to the central point 132. The curved tactile feature 104 can also include an arc length that is different (e.g., longer) than an arc length of the other corners 112a-c.

As illustrated, the radius-of-curvature 118 of the curved tactile feature 104 is different than a radius-of-curvature 120 of the corner 112b. The radius-of-curvature 120 of the corner 112b may be similar or identical to the radius-of-curvature of the corner 112a and the corner 112c. Thus, the corners 112a-c, or any suitable arrangement thereof, may be similar or identical to one another. As illustrated, the radius-of-curvature 118 of the curved tactile feature 104 is larger than the radius-of-curvature 120 of the corners 112b. Accordingly, the curved tactile feature 104 includes a longer arc length compared to the arc length of the corners 112a-c. Thus, the curved tactile feature 104 can be used (e.g., via tactile interaction) by the entity for distinguishing the corner 112d having the curved tactile feature 104 from the other corners 112a-c. By distinguishing between the corners 112a-d, the entity can identify the accessible account card 100 and can determine an orientation of the accessible account card 100.

Additionally or alternatively to the different radius-of curvature 118, the curved tactile feature 104 may include other suitable features. For example, the curved tactile feature 104 can include a notch, a raised surface, different materials, or other suitable features for providing access to the account for the entity. The notch can include a removed piece of material. For example, the curved tactile feature 104 can be positioned in the corner 112d, and a portion of the corner 112d can be removed to form the notch. The raised surface can involve a portion of the curved tactile feature 104 having a different height or thickness than other portions of the accessible account card 100. In examples in which the accessible account card 100 is positioned on a flat surface, the raised surface of the curved tactile feature 104 may rise above (or below) an average height value of the accessible account card 100. The different materials of the curved tactile feature may provide distinguishable surface differences detectable (e.g., via tactile interaction) by the entity. For example, the different materials can include plastic, metal (e.g., unfinished metal, finished metal, etc.), or other suitable materials, and the different materials can include different surface finishes such as coating for additional roughness, polishing for additional smoothness, and the like. The other suitable features can be positioned on other portions (e.g., one or more edges 114, one or more other corners 112, etc.) with respect to the accessible account card 100.

The first set of account information included with the accessible account card 100 can be positioned in various locations with respect to the accessible account card 100. For example, the first set of account information can be positioned on the background 116 (e.g., within the outline formed by the corners 112a-d and the edges 114a-d) of the accessible account card 100. The first set of account information can include the account number 106, the entity name 108, the account expiration date 110, other suitable account information, or any suitable combination thereof.

The account number 106 can be approximately centrally positioned with respect to the accessible account card 100. For example, a first distance between the account number 106 and the edge 114b may be similar or identical to a second distance between the account number 106 and the edge 114d. Additionally, a third distance between the account number 106 and the edge 114c may be similar or identical to a fourth distance between the account number 106 and the edge 114a. As illustrated, the accessible account card 100 is a financial account card. Thus, the account number 106 is illustrated as positioned closer to the edge 114a than the edge 114c to allow space on the accessible account card for a chip 122 for facilitating financial interactions. The entity name 108 can be positioned below the account number 106, and the entity name 108 can correspond to the account number 106. For example, the entity name 108 may be the name of an entity that holds an account having the account number 106. The account expiration date 110 can be positioned below the entity name 108 and can indicate an expiration of the accessible account card 100, the account associated with the accessible account card 100, other suitable information, or any suitable combination thereof.

The first set of account information can include various parameters that may optimize a readability of the first set of account information for providing accessibility for the entity to the account. For example, the parameters can include a font type, a font size, a contrast ratio, an amount of information, other suitable parameters, or any suitable combination thereof. The font type can be determined based on the readability of the font type. For example, the accessible account card may include a font type (e.g., Calibri, Times New Roman, Arial, etc.) that is optimal (e.g., a maximum ease) for readability. In some examples, the font type can include bolded features, underlined features, or other features for increasing the readability of the font. The font size of the first set of account information can be maximized for placement in respective locations on the accessible account card. For example, the account number 106 can be determined to be the maximum possible font size for fitting the account number 106 on the front side 102 of the accessible account card 100. The contrast ratio can include a minimum contrast ratio. For example, the first set of account information may be positioned on the accessible account card 100 having a contrast ratio greater than or equal to the minimum contrast ratio. The minimum contrast ratio can be 3.5, 4.0, 4.65, or any other suitable contrast ratio value for the accessible account card. In some examples, the contrast ratio of the first set of account information (e.g., with respect to the accessible account card) can allow the entity to more easily (e.g., compared to other account cards) read the first set of account information.

The curved tactile feature 104 can provide an increased amount of accessibility (e.g., compared to account cards without the curved tactile feature 104) for an entity that may experience visual impairment or other similar challenges (e.g., physical, digital, etc.). For example, the curved tactile feature 104 can indicate to the entity a type (e.g., a financial card, a medical card, etc.) of the accessible account card 100 or the account associated with the accessible account card 100. Additionally, the curved tactile feature 104 can indicate to the entity an orientation of the accessible account card 100. For example, the entity can physically interact with the curved tactile feature 104, and the entity can determine that the accessible account card 100 is positioned correctly (e.g., for inserting the accessible account card 100 into a computing device for accessing the account).

Figure 2:
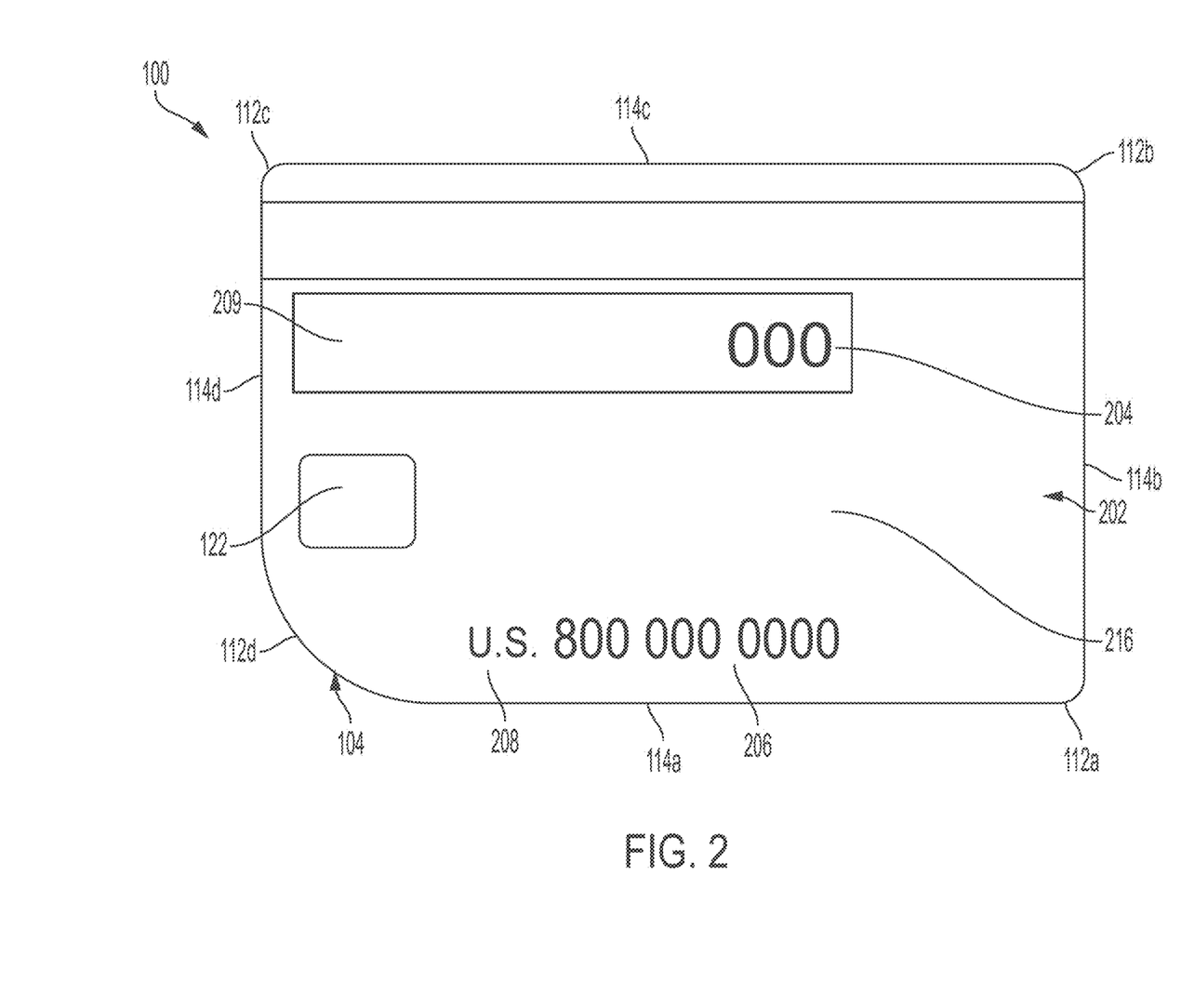
FIG. 2 is a diagram of an example of a back side of an accessible account card having a curved tactile feature according to one example of the present disclosure.

FIG. 2 is a diagram of an example of a back side 202 of the accessible account card 100 having the curved tactile feature 104 according to one example of the present disclosure. As illustrated in FIG. 2, the accessible account card 100 includes the corners 112*a-d*, the edges 114*a-d*, and a background 216 arranged similarly to (but mirrored with respect to) the corners 112*a-d*, the edges 114*a-d*, and the background 116 illustrated in FIG. 1. Additionally, the back side 202 of the accessible account card 100 can include a second set of account information that may be different than the first set of account information illustrated and described with respect to FIG. 1. For example, the second set of account information can include a security code 204, contact information 206 for a provider entity, a country code 208, other suitable information, or any suitable combination thereof.

The illustrated curved tactile feature 104 may be similar or identical to the curved tactile feature 104 illustrated with respect to FIG. 1. The curved tactile feature 104 may be positioned on a portion of the back side 202 of the accessible account card 100 that corresponds to the lower-right portion of the front side 102 of the accessible account card 100. For example, the curved tactile feature 104 can be positioned on a bottom-left portion (e.g., corresponding to the corner 112*d*) of the back side 202 of the accessible account card 100. Accordingly, the curved tactile feature 104 can be used (e.g., regardless of the side of the accessible account card 100 physically interacted with by the entity) by the entity to identify the accessible account card 100, to determine an orientation of the accessible account card 100, and to perform other suitable accessibility operations with respect to the account.

The second set of information can include the security code 204, the contact information 206, the country code 208, etc. As illustrated, the accessible account card 100 is a financial account card. Thus, the accessible account card 100 can include the security code 204, which can be an additional security feature of the account. Additionally, the contact information 206 can include a phone number, an email, a webpage URL, or any other suitable contact information. The contact information 206 can be associated with a providing entity. For example, the contact information 206 can be used by the entity that is issued the accessible account card 100 to contact the providing entity. The country code 208 can indicate the country of origin of the providing entity, of the accessible account card 100, and the like.

As illustrated, the security code 204 is positioned adjacent to a signature line 209, which can be sized to receive a signature (e.g., or other confirmation that indicates acceptance of terms associated with the account or other suitable indications) from the entity. Additionally, the contact information 206 and the country code 208 can be positioned on a bottom portion of the back side 202 of the accessible account card 100. The second set of account information, or any suitable subset thereof, can be positioned in other suitable locations with respect to the back side 202 of the accessible account card 100.

The second set of account information can include various parameters that may optimize a readability of the second set of account information for providing accessibility for the entity to the account. For example, the parameters can include a font type, a font size, a contrast ratio, an amount of information, other suitable parameters, or any suitable combination thereof. The font type can be determined based on the readability of the font type. For example, the second set of account information may include a font type (e.g., Calibri, Times New Roman, Arial, etc.) that is optimal (e.g., a maximum ease) for readability. In some examples, the font type can include bolded features, underlined features, or other features for increasing the readability of the font. The font size of the second set of account information can be maximized for placement in respective locations on the accessible account card. For example, the contact information 206 can be determined to be the maximum possible font size for fitting the contact information 206 on the back side 202 of the accessible account card 100. The contrast ratio can include a minimum contrast ratio. For example, the second set of account information may be positioned on the accessible account card 100 having a contrast ratio (e.g., between the second set of account information and the background 216) greater than or equal to the minimum contrast ratio. The minimum contrast ratio can be 3.5, 4.0, 4.65, or any other suitable contrast ratio value for the accessible account card 100. In some examples, the contrast of the second set of account information (e.g., with respect to the accessible account card 100) can allow the entity to more easily (e.g., compared to other account cards) read the second set of account information.

The front side 102 of the accessible account card 100 and the back side 202 of the accessible account card 100 can be used for accessing an associated account. For example, a using entity (e.g., a user of one or more various services associated with the accessible account card 100) can be issued the accessible account card 100 by a providing entity (e.g., a provider of the one or more various services). The using entity may experience one or more physical disabilities, one or more digital disabilities, or a combination thereof. The physical disabilities can include visual impairment (e.g., blindness, colorblindness, location-based visual impairment, etc.) or other similar physical disabilities. The digital disabilities can include challenges relating to accessing an online version of the account associated with the accessible account card 100. The using entity can overcome the physical disabilities, the digital disabilities, or a combination thereof with respect to the account using the accessible account card 100. For example, the using entity can use (e.g., via tactile interaction) the curved tactile feature 104 of the accessible account card 100 to identify the accessible account card 100 (and the associated account) and to determine an orientation or direction of the accessible account card 100. Additionally, the using entity can determine (e.g., via visual interaction) account information provided by the accessible account card 100 regardless of visual impairments such as colorblindness, location-based visual impairment, and the like.

In some examples, the accessible account card 100 can be included in a set of account cards. For example, the accessible account card 100 can be a first account card, and the set of account cards can include a second account card. The second account card may be similar to the first account card, but the second account card may not be identical to the first account card. The second account card can include corners 112 and the edges 114, but the corners and edges of the second account card may be different than those of the first account card. For example, the second account card can include a second tactile feature that is different than the curved tactile feature 104. In some examples, the second tactile feature (e.g., which is positioned in a corner of the second account card) can include an arc length that is different than the arc length of the curved tactile feature and that is different than the arc lengths of the other corners of the second account card. Additionally, the second curved tactile feature can include a radius-of-curvature that is different than the radius-of-curvature 118 of the curved tactile feature 104.

Accordingly, a using entity can determine that the second account card is different than the accessible account card 100. For example, the using entity can determine (e.g., via tactile interaction) that the curved tactile feature 104 is different than the second curved tactile feature. Determining the difference between the curved tactile feature 104 and the second curved tactile feature can indicate to the using entity the accounts associated with the respective account cards (e.g., the second account card and the accessible account card 100). Accordingly, the using entity can successfully select an account card corresponding to a desired account based on the curved tactile feature 104 and the second curved tactile feature.

Figure 3:
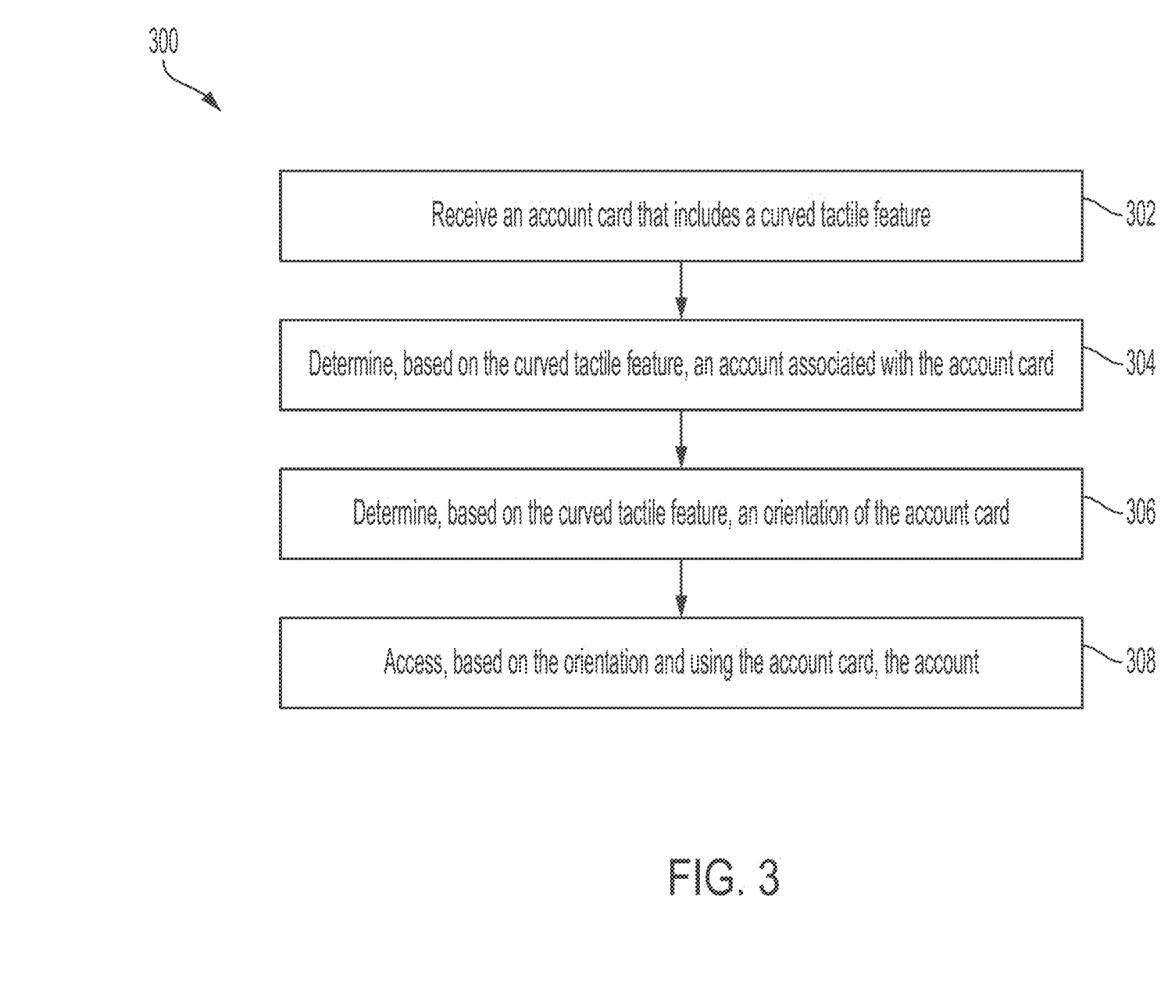
FIG. 3 is a flowchart of a process to use an account card according to one example of the present disclosure.

FIG. 3 is a flowchart of a process 300 to use an account card 100 according to one example of the present disclosure. At block 302, an account card 100 is received. The account card can include a set of sides (e.g., the corners 112 or the edges 114) and the curved tactile feature 104. The curved tactile feature 104 can include various features (e.g., as described with respect to FIG. 1) that can indicate an orientation or an account associated with the account card 100. In some examples, a providing entity (e.g., a financial services institution, an information technology services institution, etc.) can provide the account card 100 to a receiving entity (e.g., a user of various services), which may experience visual or other similar challenges.

At block 304, an account associated with the account card 100 can be determined. The using entity can use the curved tactile feature 104 to determine the account that is associated with the account card 100. For example, the using entity can physically determine (e.g., via tactile interaction) that the curved tactile feature 104 corresponds to the account. The using entity can use the curved tactile feature 104 in other suitable manners to determine the account associated with the account card 100.

At block 306, an orientation of the account card 100 can be determined. The using entity can use the curved tactile feature 104 to determine the orientation of the account card 100. For example, the using entity can physically determine (e.g., via tactile interaction of the curved tactile feature 104) the orientation of the account card 100. In some examples, the orientation can include a direction of the account card 100. For example, the using entity can physically interact with the curved tactile feature 104 to determine which direction (or other suitable measures of orientation) the account card 100 is facing.

At block 308, the account can be accessed using the account card 100. For example, in response to determining the account associated with the account card 100 and the orientation of the account card 100, the using entity can access the account. In some examples, the using entity can access the account via a physical device (e.g., an automatic teller machine, or the like). In other examples, the using entity can determine account information (associated with the account) based on the account card 100 and can use the account information to access (e.g., via a computing device) an online version of the account. The account can be accessed, in response to determining the account associated with the account card 100 and the orientation of the account card 100, by the using entity via other suitable techniques.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. And, although the subject matter has been described with reference to financial account systems and financial account data, various aspects disclosed herein can be applicable to other types of account systems and other types of data.

The invention claimed is:

1. An account card comprising:
   a plurality of surfaces defining a shape, the plurality of surfaces comprising at least one surface having a contrast ratio between a background of the at least one surface and information included on the at least one surface, and the contrast ratio exceeding 4; and
   a curved tactile feature for providing access to an account associated with the account card, the curved tactile feature associated with at least one side of a plurality of sides of the account card, the at least one side of the plurality of sides including:
      a first distance to a central point of the shape that is different than a second distance to the central point of the shape associated with the other sides of the plurality of sides; and
      a first arc length that is different than a second arc length associated with the other sides of the plurality of sides.

2. The account card of claim 1, wherein the contrast ratio is a color contrast ratio that is from 4.65 to 21, and wherein the information included on the at least one surface has a font size that is from 18 to 48.

3. The account card of claim 1, wherein the at least one surface comprises a face surface and a back surface positioned opposite the face surface, wherein the background is positioned on at least one of the face surface or the back surface, wherein the background comprises parameters for providing access to an account associated with the account card, and wherein the parameters include a color contrast ratio that is at least 4.65 between a color of information included on the background and a color of the background.

4. The account card of claim 3, wherein the background is a first background that is positioned on the face surface, wherein the information is a first set of account information, wherein the back surface comprises a second background that includes a second set of account information, and wherein the second set of account information is different than the first set of account information.

5. The account card of claim 4, wherein:
the first set of account information includes an account number associated with the account, an entity name associated with the account, and an expiration date associated with the account; and
the second set of account information includes a security code associated with the account, a confirmation line associated with the account, and contact information associated with the account.

6. The account card of claim 1, wherein the plurality of sides further comprises:
a first edge;
a second edge positioned opposite the first edge;
a third edge connected to the first edge via a first corner, wherein the third edge is connected to the second edge via a second corner that is substantially the same as the first corner; and
a fourth edge that is positioned opposite the third edge, wherein the fourth edge is connected to the first edge via a third corner that is substantially the same as the first corner and the second corner, wherein the fourth edge is connected to the second edge via a fourth corner that is different than the first corner, the second corner, and the third corner, wherein the first edge is longer than the second edge, wherein the fourth edge is longer than the third edge, and wherein the fourth corner comprises the curved tactile feature.

7. The account card of claim 6, wherein the curved tactile feature comprises a first radius-of-curvature that is greater than a second radius-of-curvature associated with the first corner, the second corner, or the third corner.

8. A card system comprising:
a first account card comprising:
a first plurality of surfaces defining a first shape, the first plurality of surfaces comprising at least one first surface having a first contrast ratio between a first background of the at least one first surface and information included on the at least one first surface, and the first contrast ratio exceeding 4; and
a first curved tactile feature for providing access to a first account associated with the first account card, the first curved tactile feature associated with at least one side of a first plurality of sides of the first account card, the at least one side of the first plurality of sides including:
a first distance to a first central point of the first shape that is different than a second distance to the first central point of the first shape associated with the other sides of the first plurality of sides; and
a first arc length that is different than a second arc length associated with the other sides of the first plurality of sides; and
a second account card comprising:
a second plurality of surfaces defining a second shape, the second plurality of surfaces comprising at least one second surface having a second contrast ratio between a second background of the at least one second surface and information included on the at least one second surface, and the second contrast ratio exceeding 4; and
a second curved tactile feature for providing access to a second account associated with the second account card, the second curved tactile feature associated with at least one side of a second plurality of sides of the second account card, the at least one side of the second plurality of sides including:
a third distance to a second central point of the second shape that is different than a fourth distance to the second central point of the second shape associated with the other sides of the second plurality of sides; and
a third arc length that is different than a fourth arc length associated with the other sides of the second plurality of sides.

9. The card system of claim 8, wherein:
the first contrast ratio is a color contrast ratio that is from 4.65 to 21, and the information included on the at least one first surface has a font size that is from 18 to 48; and
the second contrast ratio is a color contrast ratio that is from 4.65 to 21, and wherein the information included on the at least one first surface has a font size that is from 18 to 48.

10. The card system of claim 8, wherein:
the at least one first surface comprises a first face surface and a first back surface positioned opposite the first face surface, the first background is positioned on at least one of the first face surface or the first back surface, the first background comprises first parameters for providing access to a first account associated with the first account card, and the first parameters include a color contrast ratio that is at least 4.65 between a color of information included on the first background and a color of the first background; and
the at least one second surface comprises a second face surface and a second back surface positioned opposite the second face surface, the second background is positioned on at least one of the second face surface or the second back surface, the second background comprises second parameters for providing access to a second account associated with the second account card, and the second parameters include a color contrast ratio that is at least 4.65 between a color of information included on the second background and a color of the second background.

11. The card system of claim 10, wherein:
the first background is positioned on the first face surface, the information on the first background is a first set of account information, the first back surface comprises a third background that includes a second set of account information, and the second set of account information is different than the first set of account information; and
the second background is positioned on the second face surface, the information on the second background is a third set of account information, the second back surface comprises a fourth background that includes a fourth set of account information, and the third set of account information is different than the fourth set of account information.

12. The card system of claim 11, wherein:
the first set of account information includes an account number associated with the first account, a first entity name associated with the first account, and a first expiration date associated with the first account; and the second set of account information includes a first security code associated with the first account, a first confirmation line associated with the first account, and first contact information associated with the first account.

13. The card system of claim 12, wherein:
the third set of account information includes a second account number associated with the second account, a second entity name associated with the second account, and a second expiration date associated with the second account; and
the fourth set of account information includes a second security code associated with the second account, a second confirmation line associated with the second account, and second contact information associated with the second account.

14. The card system of claim 8, wherein the first plurality of sides further comprises:
a first edge;
a second edge positioned opposite the first edge;
a third edge connected to the first edge via a first corner, wherein the third edge is connected to the second edge via a second corner that is substantially the same as the first corner; and
a fourth edge that is positioned opposite the third edge, wherein the fourth edge is connected to the first edge via a third corner that is substantially the same as the first corner and the second corner, wherein the fourth edge is connected to the second edge via a fourth corner that is different than the first corner, the second corner, and the third corner, wherein the first edge is longer than the second edge, wherein the fourth edge is longer than the third edge, and wherein the fourth corner comprises the first curved tactile feature.

15. The card system of claim 14, wherein the first curved tactile feature comprises a first radius-of-curvature that is greater than a second radius-of-curvature associated with the first corner, the second corner, or the third corner.

16. A method comprising:
receiving an account card that includes:
a plurality of surfaces defining a shape, the plurality of surfaces comprising at least one surface having a contrast ratio between a background of the at least one surface and information included on the at least one surface, and the contrast ratio exceeding 4; and
a curved tactile feature for providing access to an account associated with the account card, the curved tactile feature associated with at least one side of a plurality of sides of the account card, the at least one side of the plurality of sides including:
a first distance to a central point of the shape that is different than a second distance to the central point of the shape associated with the other sides of the plurality of sides; and
a first arc length that is different than a second arc length associated with the other sides of the plurality of sides;
determining, via the information, an account associated with the account card;
determining, based on the curved tactile feature, an orientation of the account card; and
accessing, based on the information and the orientation, and by using the account card, the account associated with the account card.

17. The method of claim 16, wherein the contrast ratio is a color contrast ratio that is from 4.65 to 21, and wherein the information included on the at least one surface has a font size that is from 18 to 48.

18. The method of claim 16, wherein the at least one surface comprises a face surface and a back surface positioned opposite the face surface, wherein the background is positioned on at least one of the face surface or the back surface, wherein the background comprises parameters for providing access to an account associated with the account card, and wherein the parameters include a color contrast ratio that is at least 4.65 between a color of information included on the background and a color of the background.

19. The method of claim 18, wherein:
the background is a first background that is positioned on the face surface;
the information is a first set of account information;
the back surface comprises a second background that includes a second set of account information;
the second set of account information is different than the first set of account information;
the first set of account information includes an account number associated with the account, an entity name associated with the account, and an expiration date associated with the account; and
the second set of account information includes a security code associated with the account, a confirmation line associated with the account, and contact information associated with the account.

20. The method of claim 16, wherein:
the plurality of sides further comprises:
a first edge;
a second edge positioned opposite the first edge;
a third edge connected to the first edge via a first corner, wherein the third edge is connected to the second edge via a second corner that is substantially the same as the first corner; and
a fourth edge that is positioned opposite the third edge, wherein the fourth edge is connected to the first edge via a third corner that is substantially the same as the first corner and the second corner, wherein the fourth edge is connected to the second edge via a fourth corner that is different than the first corner, the second corner, and the third corner, wherein the first edge is longer than the second edge, wherein the fourth edge is longer than the third edge, and wherein the fourth corner comprises the curved tactile feature; and
the curved tactile feature comprises a first radius-of-curvature that is greater than a second radius-of-curvature associated with the first corner, the second corner, or the third corner.

* * * * *